(12) United States Patent
Nakagawa

(10) Patent No.: US 8,533,952 B2
(45) Date of Patent: Sep. 17, 2013

(54) PIPE FLANGE FORMING METHOD

(75) Inventor: Noriaki Nakagawa, Inuyama (JP)

(73) Assignee: Nakagawa Sangyo Co., Ltd., Inuyama-Shi (JP)

(*) Notice: Subject to any disclaimer, the term of this patent is extended or adjusted under 35 U.S.C. 154(b) by 363 days.

(21) Appl. No.: 12/975,771

(22) Filed: Dec. 22, 2010

(65) Prior Publication Data

US 2012/0161440 A1    Jun. 28, 2012

(51) Int. Cl.
*B21D 51/16*    (2006.01)
*B23P 17/00*    (2006.01)
*B21D 3/00*    (2006.01)
*B21D 19/00*    (2006.01)
*B21D 41/02*    (2006.01)

(52) U.S. Cl.
USPC .............. 29/890.08; 72/367.1; 72/370.11

(58) Field of Classification Search
USPC ...... 29/890.08, 557, DIG. 43; 72/367.1–369, 72/370.1, 370.11, 338–339; 403/335, 336, 403/337; 285/368, 336
See application file for complete search history.

(56) References Cited

U.S. PATENT DOCUMENTS

| | | | | | |
|---|---|---|---|---|---|
| 1,882,352 | A | * | 10/1932 | Woodhead et al. | 29/897.2 |
| 3,222,143 | A | * | 12/1965 | Macchini | 403/161 |
| 7,013,697 | B2 | * | 3/2006 | Barber | 72/370.06 |
| 2005/0103565 | A1 | | 5/2005 | Nakagawa | |
| 2006/0162326 | A1 | | 7/2006 | Nakagawa | |
| 2006/0191259 | A1 | | 8/2006 | Nakagawa | |

FOREIGN PATENT DOCUMENTS

| | | |
|---|---|---|
| JP | 8-75063 | 3/1996 |
| JP | 2010-120066 | 6/2010 |

* cited by examiner

*Primary Examiner* — David Bryant
*Assistant Examiner* — Matthew P Travers
(74) *Attorney, Agent, or Firm* — J-TEK Law PLLC; Jeffrey D. Tekanic

(57) ABSTRACT

A method for forming a flange at an open end of a pipe comprises increasing the diameter of the open end of the pipe to form a radially-enlarged pipe wall. Radially-symmetric portions of the radially-enlarged pipe wall are then removed so as to form at least two opposing projecting portions, which are then bent outwardly so as to be at least substantially orthogonal to the pipe, thereby forming the flange on the pipe.

16 Claims, 8 Drawing Sheets

PRIOR ART

PRIOR ART

PIPE FLANGE FORMING METHOD

BACKGROUND OF THE INVENTION

1. Field of the Invention

The present invention relates to a method for forming a flange on an open end of a pipe, e.g., for vehicle exhaust pipes.

2. Description of the Related Art

FIGS. 11 and 12 show an example of a known vehicle exhaust pipe coupling structure. In FIG. 12, approximately rhombic-shaped coupling flanges 61, 62 (see FIG. 11) are welded to the outer peripheral ends of an upstream exhaust pipe 1 and a downstream exhaust pipe 2, respectively. A gasket 63 disposed between the coupling flanges 61, 62 and the exhaust pipes 1 and 2 are joined using bolts 64 and nuts 65.

Japanese Laid-Open Patent Publication No. H8-75063 discloses a connecting structure for an exhaust pipe, in which flanges are welded to the respective outer peripheries of a first exhaust pipe and a second exhaust pipe. The second exhaust pipe is fitted into the opening of one end of the first exhaust pipe. The flanges are joined by bolts and nuts.

However, since the coupling flanges 61 and 62 have to be affixed to the outer peripheries of the ends of the exhaust pipes 1 and 2 by welding in the above described known structure, stress concentrates at the weld, which can easily lead to cracks and breakage caused, e.g., by vehicle vibrations. In addition, the welding step requires additional labor and costs.

SUMMARY OF THE INVENTION

It is an object of the present teachings to disclose an improved method for forming a flange on the open end of a pipe, e.g., a vehicle exhaust pipe, which reduces or eliminates the risk of breakage caused by vibrations, etc., when utilized to couple, e.g., two exhaust pipes. In addition, the resulting exhaust pipe may be lighter, have a reduced part count and/or lower manufacturing costs.

In one aspect of the present teachings, a method for forming a flange on the open end of a pipe includes increasing the diameter of an open end portion of a pipe body, e.g., a circular pipe body. Then, radially-symmetric portions of the resulting enlarged-diameter pipe wall are removed so as to form two opposing projecting portions. Thereafter, the two projecting portions are bent outward so that the projecting portions are approximately orthogonal to the pipe body and form the flange at the end of the pipe.

A pipe flange formed in this manner will be integral with the open end of the pipe body. Therefore, there is no need to affix, e.g., weld, a separated flange to the outer periphery of the pipe body, as is required in known pipe flange forming techniques. Consequently, when such a method is utilized, e.g., to form a flange on a vehicle exhaust pipe, stress concentration at a welded portion of the flange can be avoided, as well as cracks and breakage caused, for example, by vehicle vibrations. Moreover, by eliminating a welding step, manufacturing costs can be reduced, the pipe will be lighter and the part count is reduced.

In another aspect of the present teachings, the removing step may preferably include removing the radially-symmetrical portions of the pipe wall along an expansion curve having first and second vertices that approach a base portion of the radially-enlarged pipe wall (i.e. to the not-enlarged axial end of the pipe body). The expansion curve preferably at least substantially defines the final outer shape of the flange. According to this aspect, the pipe-end flange can be obtained with the desired outer shape by simply bending the projecting portions to approximately orthogonal positions relative to the pipe body. No further processing or manufacturing steps are required.

In another aspect of the present teachings, a space or housing for a gasket can be formed by depressing an annular or ring-shaped recess into the surface of the flange adjacent to the opening of the not-enlarged pipe body.

Further objects, features, advantages and aspects of the present teachings will become apparent after reading the following description and claims in view of the drawings.

DETAILED DESCRIPTION OF THE PREFERRED EMBODIMENT

Figure 1:
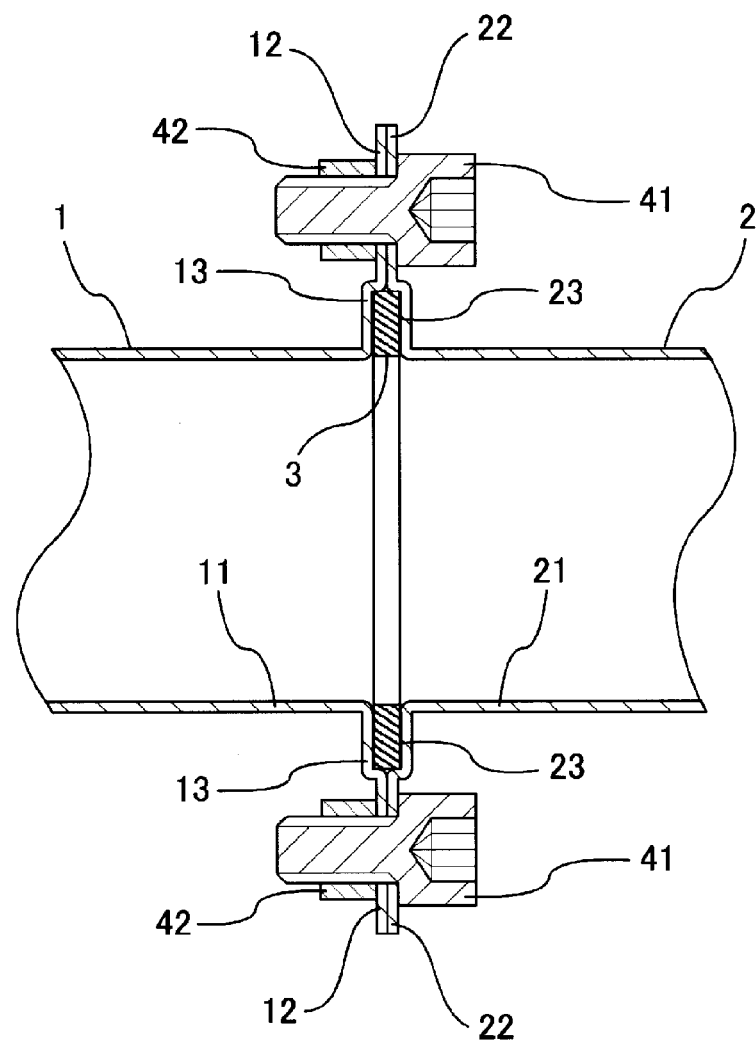
FIG. 1 is a transverse cross sectional view of coupled vehicle exhaust pipes in accordance with an embodiment of the present teachings.

FIG. 1 shows a representative example of an upstream exhaust pipe 1 joined to a downstream exhaust pipe 2 via pipe-end flanges 12, 22 formed in accordance with the below-described method. More specifically, radially-outwardly-extending pipe-end flanges 12 and 22 are formed at an opening edge of an opening of a downstream end 11 of the upstream exhaust pipe 1 and at an opening edge of an opening of an upstream end 21 of the downstream exhaust pipe 2, respectively. The pipe-end flanges 12 and 22 are coupled together via bolts 41 and nuts 42 with a sealing member or gasket 3 interleaved in a space defined by recessed housing portions 13 and 23. The pipes 1, 2 and flanges 12, 22 are preferably formed of malleable steel, although other heat-resistant, malleable materials may be utilized for vehicle applications. For non-vehicle applications, the material forming the pipe 1, 2 and flange 12, 22 need not be heat-resistant, but it should be ductile or malleable, i.e. it should be plastically deformable without fracture.

Figure 2:
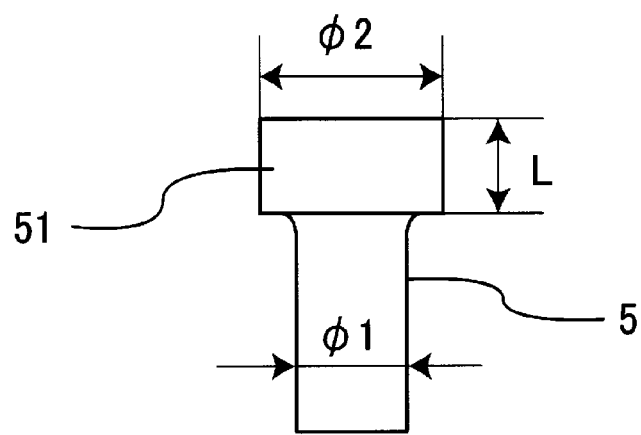
FIG. 2 is a side view showing a pipe body with a radially-enlarged pipe wall after a first diameter increasing step for forming the flange on the end of the pipe.

The pipe-end flanges 12, 22 are preferably formed according to the following method. As shown in FIG. 2, the diameter of one open end portion 51 of a circular pipe body 5, which will ultimately serve as the exhaust pipe 1, is increased or enlarged using a bulging punch and a die (not shown) so as to form a stepped or radially-enlarged portion (pipe wall) having an axial length L. This pipe end diameter increasing step may be carried out in one step or in a plurality of steps in accordance with the requirements of the particular manufacturing process and the flange size desired to be formed.

Figure 3:
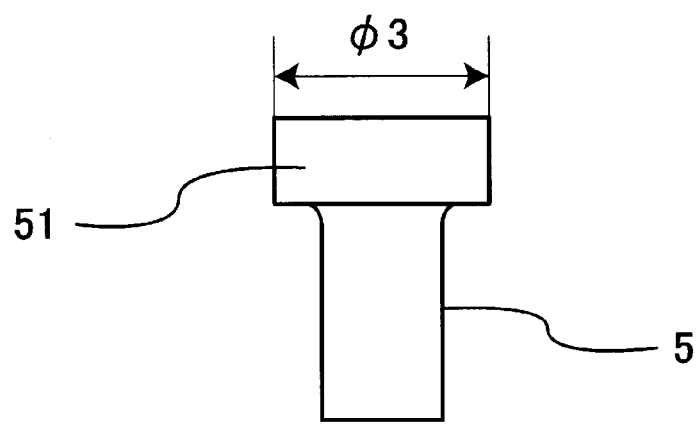
FIG. 3 is a side view showing the pipe body and radially-enlarged pipe wall after a second diameter increasing step.
Figure 4:
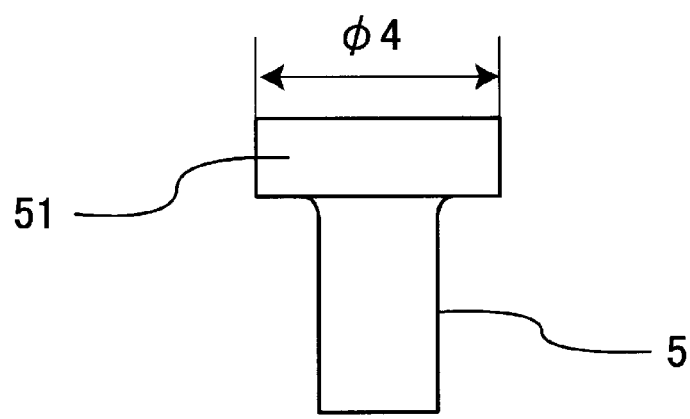
FIG. 4 is a side view showing the pipe body and radially-enlarged pipe wall after a third diameter increasing step.
Figure 5:
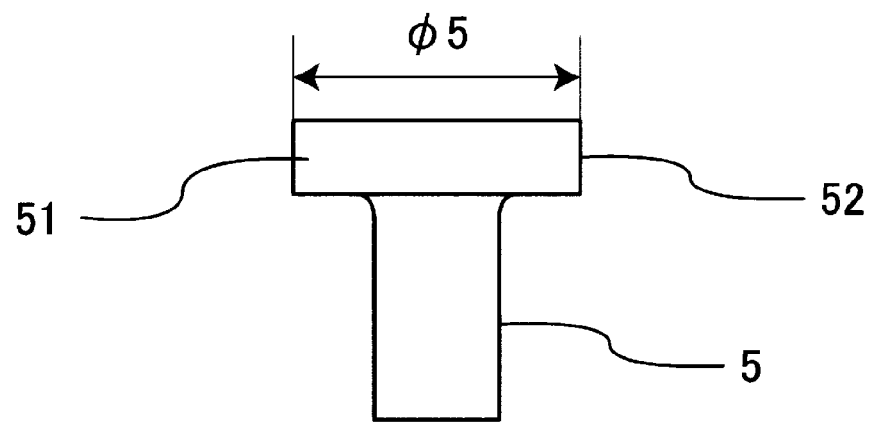
FIG. 5 is a side view showing the pipe body and radially-enlarged pipe wall after a fourth diameter increasing step.

For example, prior to the diameter increasing step, the pipe body 5 (and its open end portion 51) may have an outer diameter φ1 of 48.6 mm and a thickness of 1.2 mm. The outer diameter φ1 of the open end portion 51 may be increased to an outer diameter φ2 of 61 mm (FIG. 2) in a first diameter increasing step. Then, the outer diameter of the open end portion 51 may be increased to a diameter φ3 of 67.4 mm (FIG. 3) using the bulging punch and die in a second diameter increasing step. Thereafter, a third diameter increasing step may be carried out using the bulging punch and die in order to increase the outer diameter of the open end portion 51 to a diameter φ4 of 74.0 mm (FIG. 4). The outer diameter of the open end portion 51 may then be increased one more time to a diameter φ5 of 80.3 mm (FIG. 5) using the bulging punch and die in a fourth diameter increasing step. As will be understood, the number of diameter increasing steps is not limited in the present teachings and more or less than four diameter increasing steps may be utilized.

Figure 6:
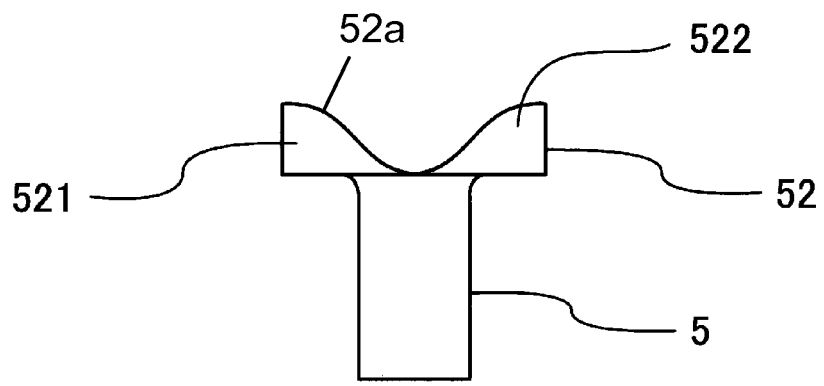
FIG. 6 is a side view of the pipe after radially-symmetric portions have been removed from the radially-enlarged pipe wall.

After the diameter of the end portion 51 of the pipe body 5 has been increased or enlarged to the desired amount, portions of the radially-enlarged pipe wall 52 (FIG. 5) of the open end portion 51 having the increased diameter are removed. As shown in FIG. 6 (removal step), two portions are removed that are radially symmetric to each other and are spaced from each other by 180°. These portions are preferably removed along an expansion curve 52a that has two vertices, which approach or come close to the base portion of the radially-enlarged pipe wall 52 (i.e. the vertices come close to, but are spaced a small distance from, the pipe body 5 still having the outer diameter φ1). The expansion curve 52a is preferably defined such that the resulting pipe-end flange will have a predetermined shape after the two remaining projecting portions 521, 522 are radially expanded (orthogonally bent) in a subsequent bending step, which will be described below. The two portions may be removed, for example, by grinding with a sanding or grinding machine or by laser cutting.

As a result of the removal step, a pair of peak-shaped projecting portions 521, 522 remain in the pipe wall 52 at opposing positions spaced from each other by 180°. It is not absolutely required to remove the portions of the pipe wall so that a smooth curve shape results after the removing step. However, by providing smooth peak-shaped projecting portions 521, 522 in this step, it is possible to obtain the pipe-end flange with the desired outer shape by simply bending the projecting portions 521, 522 in the manner described below.

Figure 7:
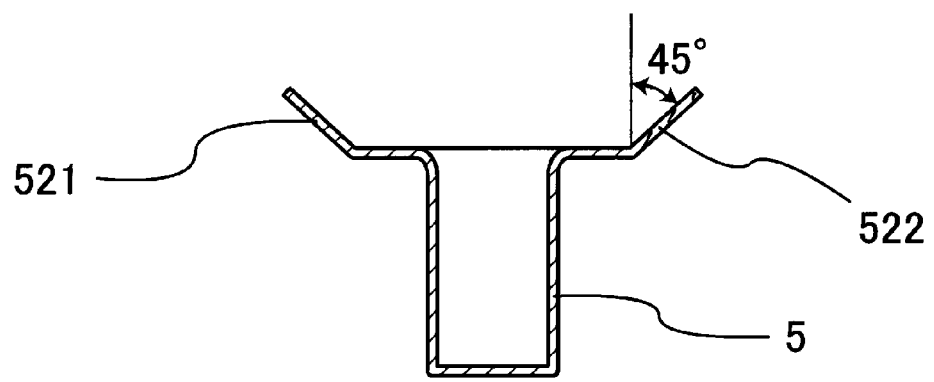
FIG. 7 is a cross sectional view showing the pipe body and radially-enlarged pipe wall after a first bending step.
Figure 8:
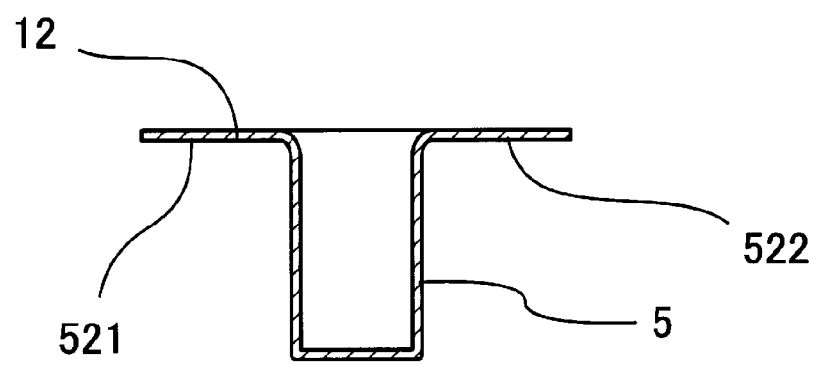
FIG. 8 is a cross sectional view showing the pipe body and radially-enlarged pipe wall after a second bending step, wherein the orthogonal flange is formed on the end of the pipe.
Figure 10:
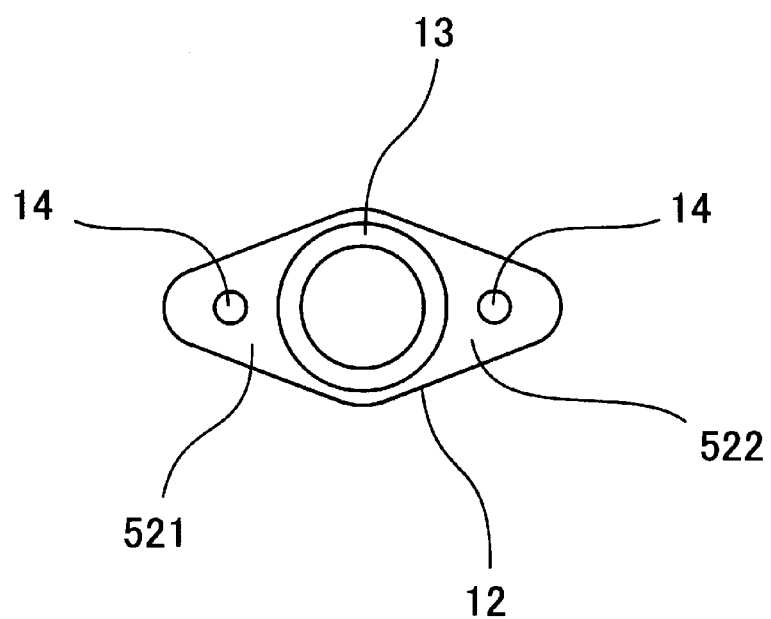
FIG. 10 is an end view of the completed flange.
Figure 11:
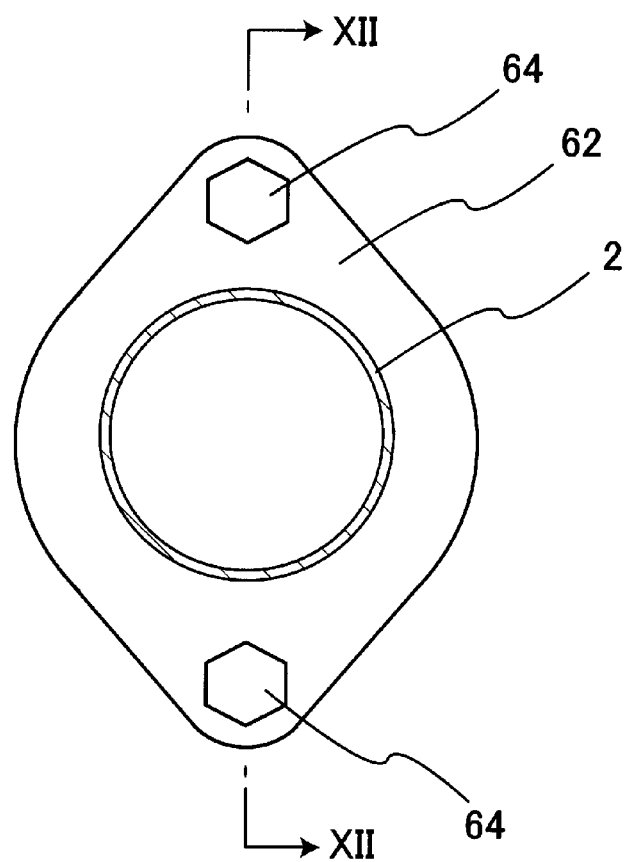
FIG. 11 is an end view of a pipe flange according to a known example.
Figure 12:
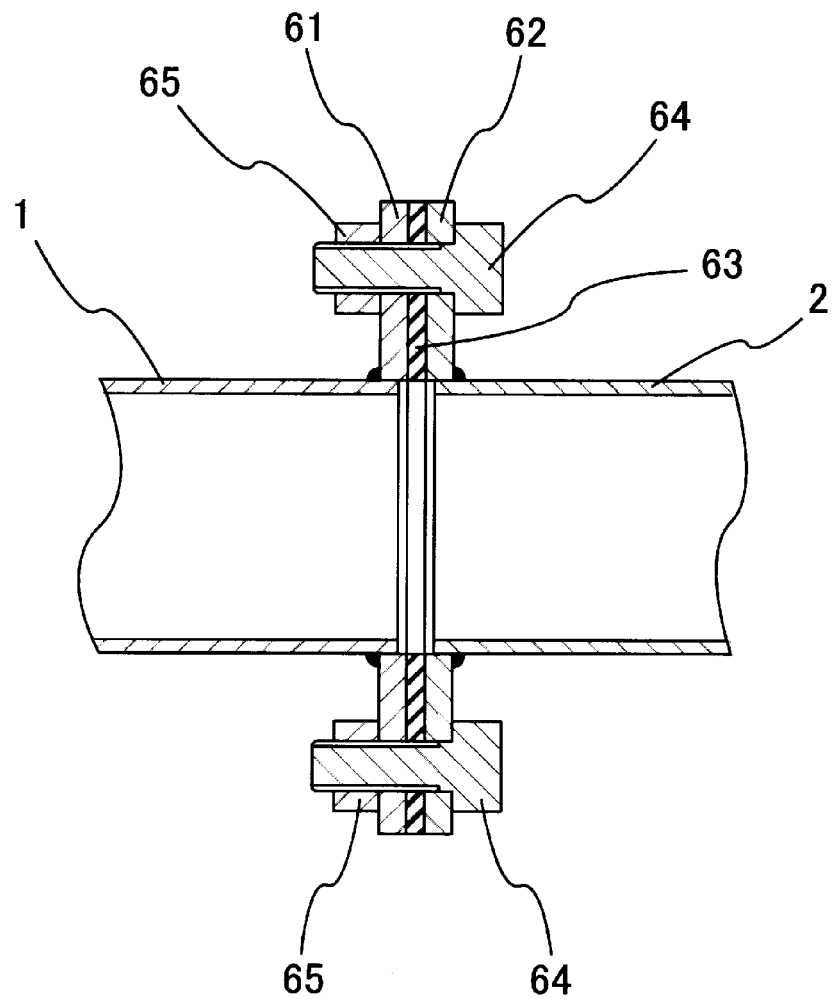
FIG. 12 is a vertical cross sectional view taken along the line XII-XII of FIG. 11 showing a known exhaust pipe coupling structure.

After the removal step, the projecting portions 521, 522 of the pipe wall 52 are bent outward (radially or orthogonally outward) using a bending punch. In the present embodiment, the bending step may be carried out in two steps, although more or fewer bending steps may be employed. For example, in a first bending step, the projecting portions 521, 522 are each bent outward by about 45° as shown in FIG. 7. Then, in a subsequent second bending step, the projecting portions 521, 522 are each bent outward to the orthogonal positions shown in FIG. 8, i.e. the projecting portions 521, 522 are approximately 90° or perpendicular relative to the axial direction of the pipe body 5. As a result, as shown in FIG. 10, a pipe-end flange 12 is formed at the open edge of the circular pipe body 5 and includes the projecting portions 521, 522 radially extending to the left and right in the same plane.

Figure 9:
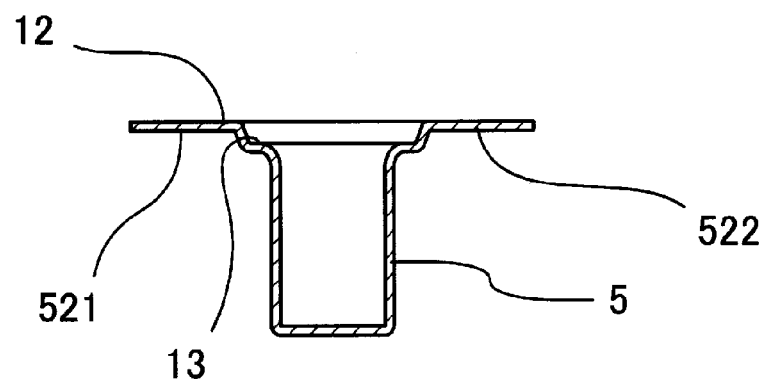
FIG. 9 is a cross sectional view showing an annular space formed in the flange for housing a gasket.

After the bending step(s) have been completed, an annular recessed portion may be formed in the pipe-end flange 12 along the outer periphery of the pipe body opening 51 by depressing a ring shape by a certain amount (e.g., about 2 mm) using a stepping punch, thereby forming a gasket housing portion 13 as shown in FIG. 9. In addition or in the alternative, bolt insertion holes 14 may be formed, e.g., drilled, in the plate surfaces of each of the left and right projecting portions 521, 522 of the pipe-end flange 12 (see FIG. 10).

The pipe-end flange 22 of the downstream exhaust pipe 2 (FIG. 1) may be formed according to substantially the same method.

When the two pipe bodies 5 are formed with the pipe-end flanges 12 and 22 in this manner and are used as the upstream and downstream exhaust pipes 1, 2, the two exhaust pipes 1 and 2 can be coupled to each other in an air-tight manner using the bolts 41 inserted in the bolt insertion holes 14, the nuts 42 screwed on the bolts and a sealing member (gasket) 3 interleaved in the space defined by the housing portions 13 and 23 of the pipe-end flanges 12 and 22.

According to the present embodiment, each of the pipe-end flanges 12 and 22 can be integrally formed at a respective end of the exhaust pipes 1, 2. Therefore, there is no need to affix (weld) a separated flange to the outer periphery of the end of the exhaust pipe, as has been required in known pipe flange forming methods. Consequently, the above-described pipe flange forming method avoids or substantially minimizes problems, such as stress concentration at the welding joint of the flange, and generation of cracks and breakage due to, for example, vehicle vibrations. In addition, the preferred method eliminates the labor and costs associated with a flange welding step. Moreover, a reduction in weight and part count can also be achieved.

Naturally, the present teachings are not limited to vehicle exhaust pipes and may be used with any pipe that requires a flange formed on an axial end thereof.

A representative, non-limiting example of the present invention was described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved pipe flanges and methods for manufacturing the same.

Moreover, combinations of features and steps disclosed in the above detail description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

The invention claimed is:

1. A method for forming a flange at an open end of a pipe, comprising:
   increasing the inner and outer diameter of the open end of a wall of the pipe by radially-outwardly stretching the pipe wall to form a radially-enlarged pipe wall;
   removing radially-symmetric portions of the radially-enlarged pipe wall so as to form at least two opposing projecting portions; and
   bending the at least two projecting portions outwardly so as to be at least substantially orthogonal to the pipe, thereby forming the flange on the pipe.

2. The method according to claim 1, wherein the removing step comprises removing the radially-symmetrical portions along an expansion curve having vertices, which are close to a base portion of the radially-enlarged pipe wall, wherein the expansion curve at least substantially conforms to a predetermined outer shape of the flange.

3. The method according to claim 2, further comprising:
   forming a recess in the flange for housing a gasket.

4. The method according to claim 3, wherein the recess is disposed at a boundary of the open end of the pipe and the flange that radially extends from the open end of the pipe.

5. The method according to claim 4, wherein the diameter increasing step comprises increasing the diameter of the open end of the pipe in a plurality of discrete steps.

6. The method according to claim 5, wherein the bending step comprises bending the at least two projecting portions in a plurality of discrete steps.

7. The method according to claim 6, wherein the removing step comprises laser cutting or grinding with a sanding or grinding machine.

8. The method according to claim 7, wherein the diameter increasing step includes forming a stepped portion in the pipe wall.

9. The method according to claim 1, further comprising:
   forming a recess in the flange for housing a gasket.

10. The method according to claim 9, wherein the recess is disposed at a boundary of the open end of the pipe and the flange that radially extends from the open end of the pipe.

11. The method according to claim 10, wherein the recess is at least substantially annular.

12. The method according to claim 1, wherein the removing step comprises laser cutting or grinding with a sanding or grinding machine.

13. The method according to claim 1, wherein the diameter increasing step includes forming a stepped portion in the pipe wall.

14. A method for forming a vehicle exhaust pipe coupled structure comprising:
   increasing the inner and outer diameter of the open end of a wall of first and second pipes by radially-outwardly stretching the respective pipe walls to form a radially-enlarged pipe wall on each of the first and second pipes,
   removing radially-symmetric portions from each radially-enlarged pipe wall so as to form at least two opposing projecting portions on each of the first and second pipes,
   bending the at least two projecting portions of each of the first and second pipes outwardly so as to be at least substantially orthogonal to the remainder of each pipe, thereby forming a flange on each pipe,
   forming a recess in each flange for housing a gasket,
   disposing a gasket in the recess of the first pipe, and
   joining the second pipe to the first pipe, with the gasket interleaved therebetween, using a bolted connection.

15. The method according to claim 14, wherein the removing step comprises laser cutting or grinding with a sanding or grinding machine.

16. The method according to claim 15, wherein the diameter increasing step includes forming a stepped portion in the pipe wall.

* * * * *